US008844640B2

(12) United States Patent
Linares

(10) Patent No.: US 8,844,640 B2
(45) Date of Patent: Sep. 30, 2014

(54) EXTENSIBLE AND GROUND SUPPORT FIRE CURTAIN

(75) Inventor: Miguel A. Linares, Bloomfield Hills, MI (US)

(73) Assignee: Oria Collapsibles, LLC, Auburn Hills, MI (US)

( * ) Notice: Subject to any disclaimer, the term of this patent is extended or adjusted under 35 U.S.C. 154(b) by 895 days.

(21) Appl. No.: 12/850,666

(22) Filed: Aug. 5, 2010

(65) Prior Publication Data

US 2011/0067891 A1 Mar. 24, 2011

Related U.S. Application Data

(60) Provisional application No. 61/244,581, filed on Sep. 22, 2009.

(51) Int. Cl.

| | |
|---|---|
| ***A62C 8/00*** | (2006.01) |
| ***A62C 25/00*** | (2006.01) |
| ***E04B 1/34*** | (2006.01) |
| ***B62D 53/04*** | (2006.01) |
| ***A62C 2/10*** | (2006.01) |
| ***A62C 3/02*** | (2006.01) |

(52) U.S. Cl.
CPC ................ *A62C 2/10* (2013.01); *A62C 3/0257* (2013.01)
USPC .................................... 169/48; 169/51; 52/3

(58) Field of Classification Search
USPC ......... 169/48, 49, 50, 51; 52/23, 64, DIG. 12; 160/22, 46, 25, 62, 71, 80, 70, 74, 77, 160/79, 82, 84.09, 94.11, 160, 165, 187, 160/199
See application file for complete search history.

(56) References Cited

U.S. PATENT DOCUMENTS

| | | | | |
|---|---|---|---|---|
| 1,650,323 | A * | 11/1927 | Byars | 135/120.1 |
| 1,749,197 | A * | 3/1930 | Stuart | 160/68 |
| 3,715,843 | A * | 2/1973 | Ballinger | 52/3 |
| 4,033,367 | A * | 7/1977 | Johnston | 135/100 |
| 4,187,896 | A | 2/1980 | Shore | |
| 4,858,395 | A * | 8/1989 | McQuirk | 52/3 |
| 5,608,992 | A * | 3/1997 | Floyd | 52/3 |
| 5,746,237 | A * | 5/1998 | Arnic | 135/88.06 |
| 5,748,072 | A * | 5/1998 | Wang | 340/286.05 |
| 5,860,251 | A * | 1/1999 | Gleich | 52/2.25 |
| 5,944,114 | A * | 8/1999 | Farley | 169/48 |
| 6,095,221 | A * | 8/2000 | Frey, Jr. | 160/67 |
| 6,119,411 | A | 9/2000 | Mateu et al. | |
| 6,327,821 | B1 | 12/2001 | Chang | |
| 6,810,626 | B2 * | 11/2004 | Meyer et al. | 52/1 |
| 7,635,728 | B2 | 12/2009 | Diakoumakos et al. | |
| 7,676,991 | B2 | 3/2010 | Truss | |

(Continued)

*Primary Examiner* — Justin Jonaitis
*Assistant Examiner* — Chee-Chong Lee
(74) *Attorney, Agent, or Firm* — Gifford, Krass, Sprinkle, Anderson & Citkowski, P.C.; Douglas J. McEvoy

(57) ABSTRACT

A ground supported and upwardly extensible firewall curtain, such as for use in containing fires. A plurality of ground anchored and elongated housing are arranged in end-to-end interconnected fashion, such as in an advance position of an approaching fire. Each housing assembly includes an interiorly stored and upwardly extended curtain constructed of a fire resistant material. The curtains are likewise interconnected in end-to-end and inter-structurally supported fashion and so that a continuous fire wall is created to prevent or retard the advance of the fire in a given direction, such as toward residential or other populated areas.

15 Claims, 9 Drawing Sheets

(56) References Cited

U.S. PATENT DOCUMENTS

| | | | | |
|---|---|---|---|---|
| 7,812,253 | B2 | 10/2010 | Moselle | |
| 8,146,298 | B2 * | 4/2012 | Bush et al. | 52/23 |
| 2002/0046522 | A1 | 4/2002 | Kilduff et al. | |
| 2004/0050411 | A1 * | 3/2004 | Lawrence | 135/128 |
| 2005/0170725 | A1 | 8/2005 | Kimener | |
| 2005/0229920 | A1 | 10/2005 | Grillot | |
| 2006/0150533 | A1 | 7/2006 | Lin et al. | |
| 2006/0213138 | A1 | 9/2006 | Milani et al. | |
| 2007/0281116 | A1 | 12/2007 | Matviya et al. | |
| 2008/0128095 | A1 * | 6/2008 | Van Zutven | 160/22 |

* cited by examiner

EXTENSIBLE AND GROUND SUPPORT FIRE CURTAIN

CROSS-REFERENCE TO RELATED APPLICATIONS

This Application claims the benefit of U.S. Provisional Application 61/244,581 filed on Sep. 22, 2009.

FIELD OF THE INVENTION

The present invention teaches a ground supported and upwardly extensible firewall curtain, such as for use in containing forest fires and the like. A plurality of ground anchored and elongated housing are arranged in end-to-end interconnected fashion, such as in an advance position of an approaching fire. Each housing assembly includes an interiorly stored and upwardly extended curtain constructed of a fire resistant material. The curtains are likewise interconnected in end-to-end fashion and so that the continuous fire wall is created to prevent or retard the advance of the fire in a given direction, such as toward residential or other populated areas.

BACKGROUND OF THE INVENTION

Fire containment technologies and associated tactics are known in the art, in particular instances intended to retard or prevent the spread of burning forest fires such as into residential areas which may reside within or adjacent to heavily wooded areas which are susceptible to fire. Conventional fire fighting practices include the dropping of chemical retardants from planes or helicopters. Additional known tactics include the clearing of areas of trees and other wooded brush in advance of a progressing fire, such as in order to create a fire break. Shortcomings of such known techniques include the requirement that they be implemented by such as professional or volunteer fire departments, this providing a residential homeowner or community no reasonable ability to implement any effective fire containment strategy for combating wildfires and the like.

SUMMARY OF THE INVENTION

The present invention discloses a ground supported and upwardly extensible firewall curtain, such as for use in containing fires. A plurality of ground anchored and elongated housing are arranged in end-to-end interconnected fashion, such as in an advance position of an approaching fire.

Each housing assembly further includes an interiorly stored and upwardly extended curtain constructed of a fire resistant material. A support structure, either pivotal or telescoping, is incorporated into the housing assembly and interfaces with supports integrated into the curtain construction in order to expand/elevate and lock into place the curtain.

Ground supported stanchions extend from elevated locations of the curtain to provide further fixing support to the housing, such as in response to high winds or the like. The curtains are likewise interconnected in end-to-end and interstructurally supported fashion and so that a continuous fire wall is created to prevent or retard the advance of the fire in a given direction, such as toward residential or other populated areas.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
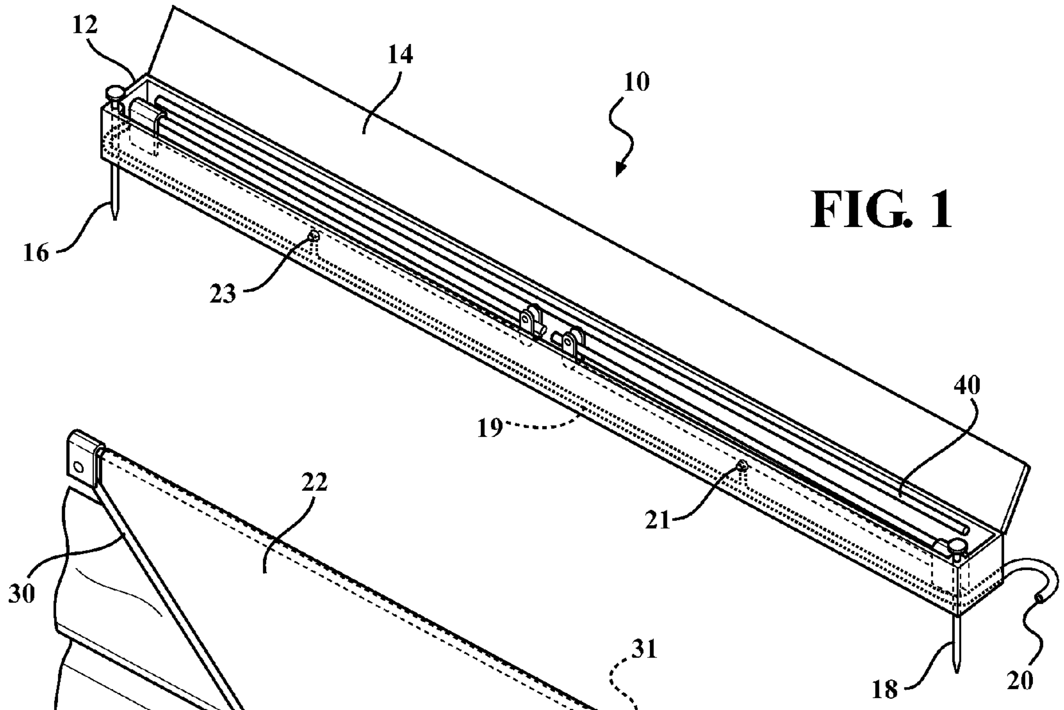
FIG. 1 is a perspective view of a fire curtain and elongate ground supported housing according to a one embodiment and in a first retracted position.
Figure 2:
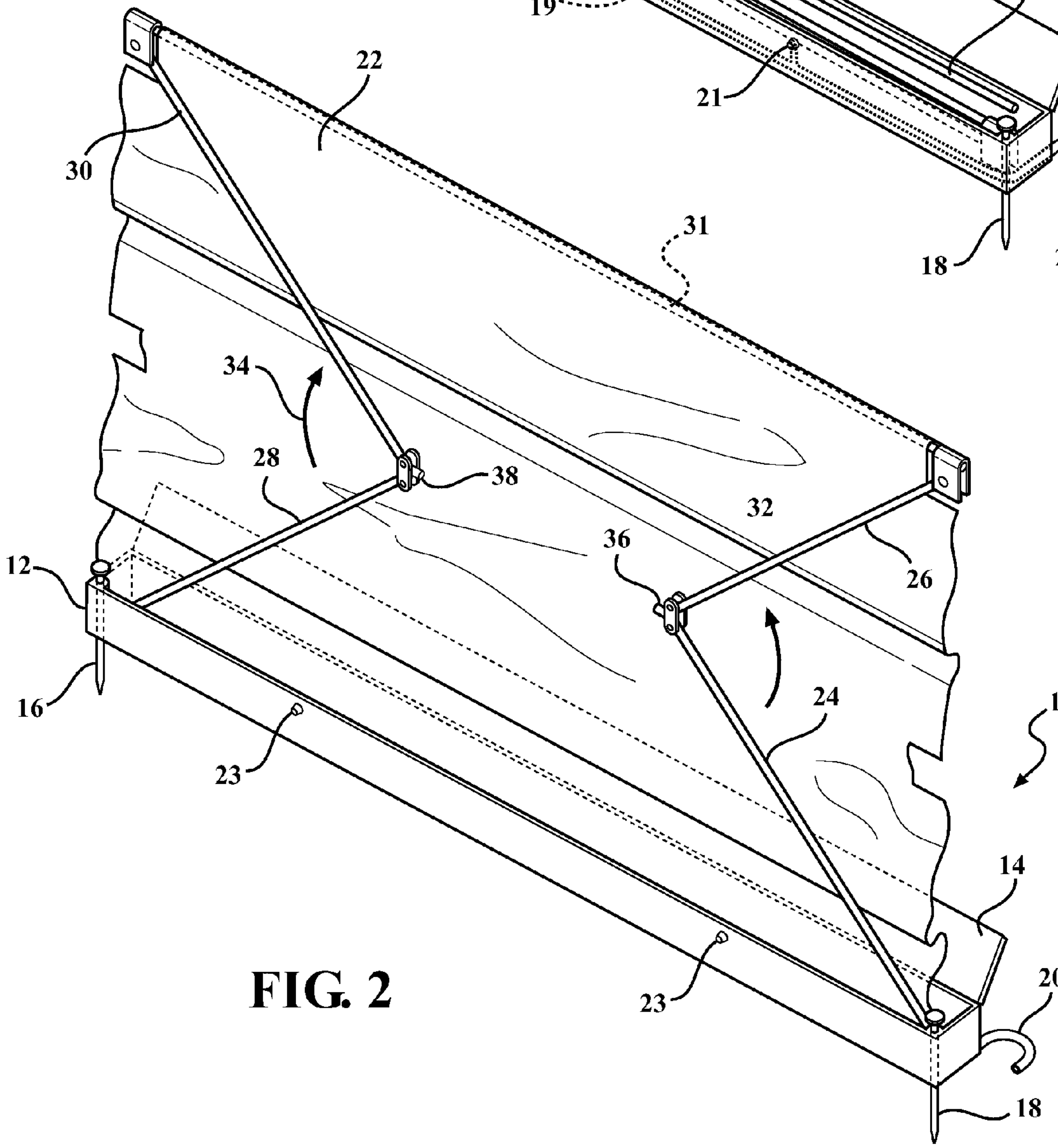
FIG. 2 is a succeeding illustration of the fire curtain of FIG. 1 in a semi upwardly extended position and by which first and second elongated and side articulating supports are utilized to upwardly displace the curtain.
Figure 3:
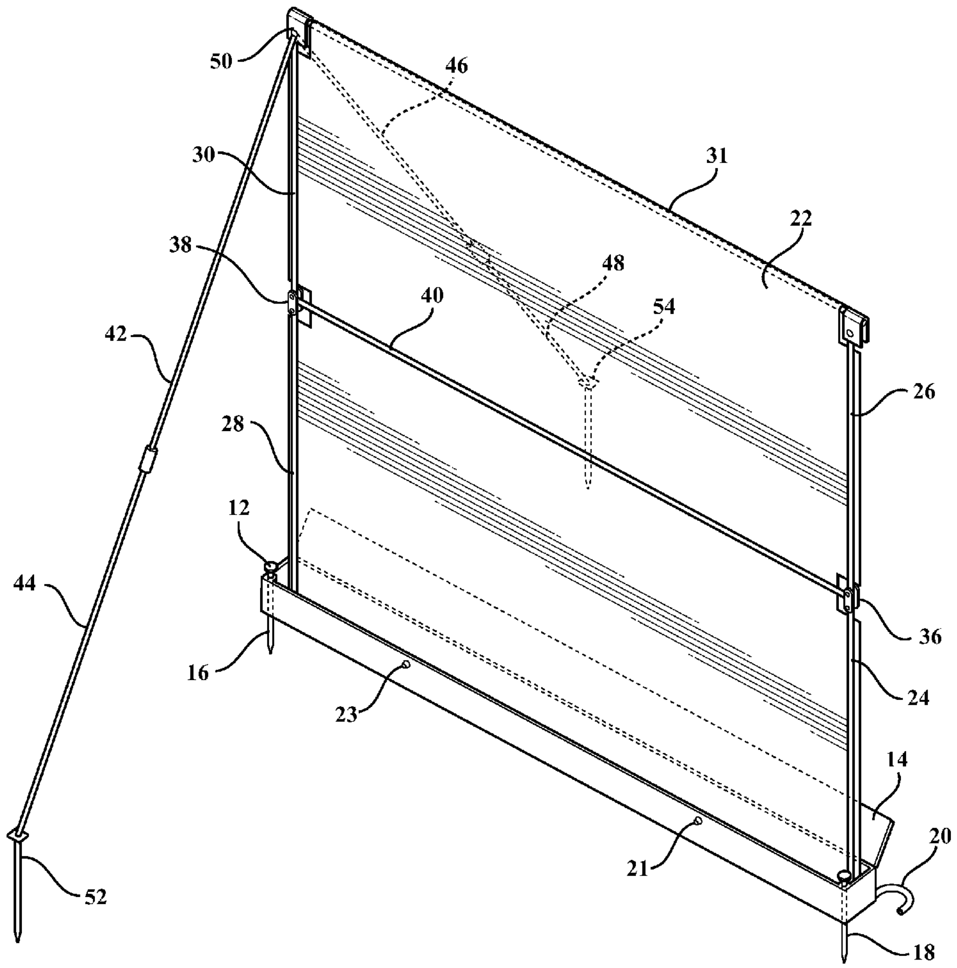
FIG. 3 is an illustration of the fire curtain of FIGS. 1 and 2 in a fully upwardly extended position in which the side articulating supports are generally vertically extending and including the additional features of an intermediate and width extending bar support, with additional reinforcement provided by rigid supports or tension cables extending from top locations of the curtain and supported by ground engaged spikes.

Referring now to FIG. 1, with succeeding reference to FIGS. 2 and 3, a perspective view is generally shown at 10 of a fire curtain and elongate ground supported housing according to a non-limiting embodiment and in a first retracted position. The housing, as shown at 12, exhibits an elongated and generally rectangular shaped three dimensional housing including elongated sides, interconnected ends and a depth defining base.

A lid 14 is hingedly secured to a top extending side of the housing 12 and, as shown in FIG. 1, is pivoted open to reveal the curtain assembly in a retracted/stored condition within the open interior of the housing. The housing 12 and lid 14 are further constructed of a durable and flame/heat retardant material, such as including without limitation a metal or polymeric thermoset structure.

Also shown are spikes 16 and 18 which extend through corner locations of the housing 12, these being vertically apertured to permit passage of the spikes and in order to secure the housings upon a ground surface, such as arranged in an advanced direction of a path of a traveling fire. An arcuate shaped hose bib is also shown at 20 and, with further reference to the teachings of FIGS. 7 and 8, communicates with a water/spray dispensing architecture incorporated into the housing 12 (see further interior extending fluid line in phantom at 19 in FIG. 1 in communication with both the hose bib 20) to provide for fluid interconnection between each of a plurality of end to end interconnected housings.

In this fashion, either a water or a liquid flame retardant communicated with an initial hose bib provides a continuous spray or misting effect (see further such as which is distributed through apertures 21 and 23 defined at forward facing locations of the housing in fluid communication with the interior extending) through an interconnected network of housings. Although not shown in FIG. 1, an extending end of the interior conduit 19 communicates with an end aperture in the initial housing 12 and for receiving an inserting end of a hose bib extending from a second identically constructed housing 12.

Figure 9:
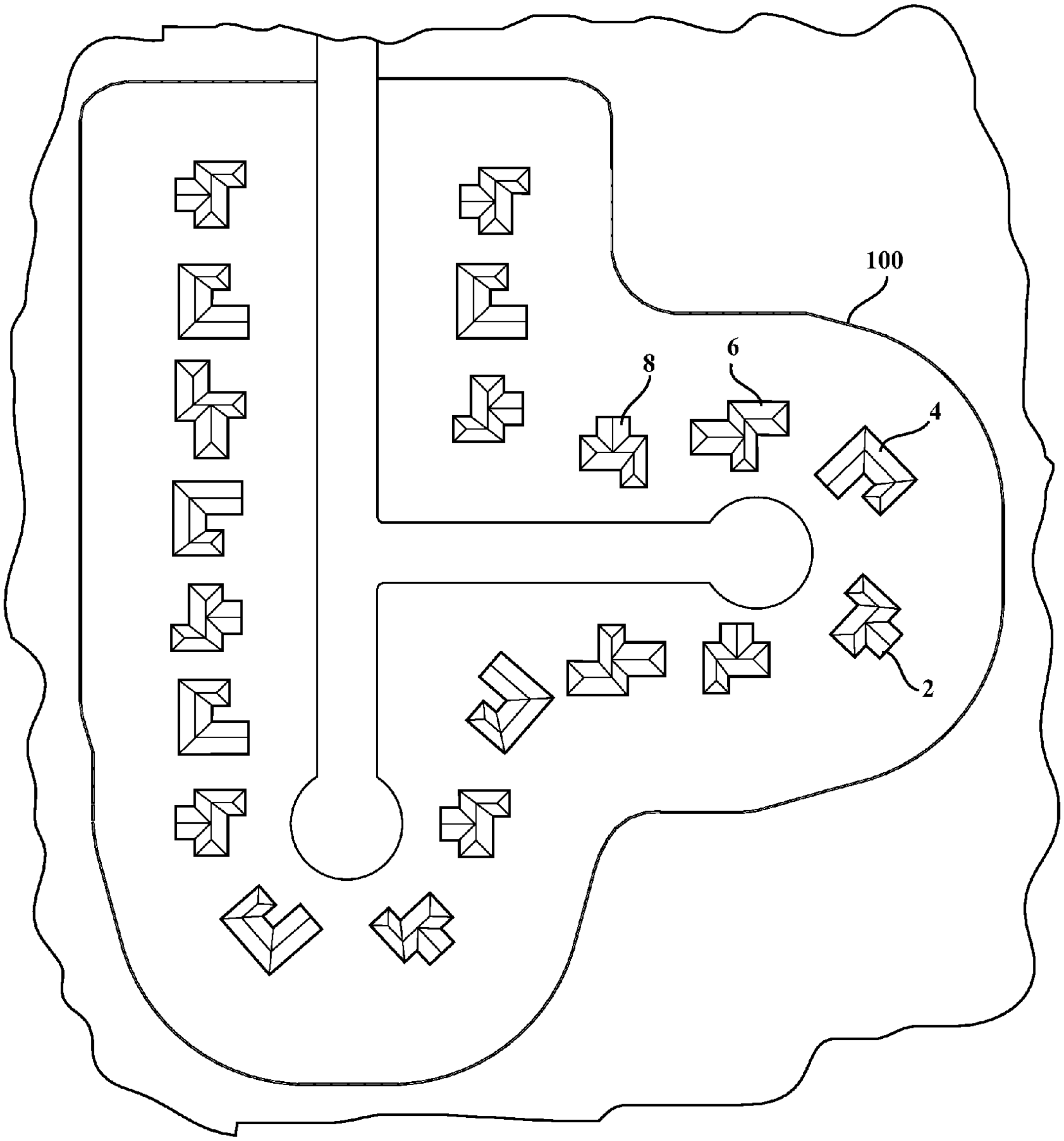
FIG. 9 is an overhead birds eye illustration of a perimeter extending application of the fire curtain about a residential subdivision.
Figure 10:
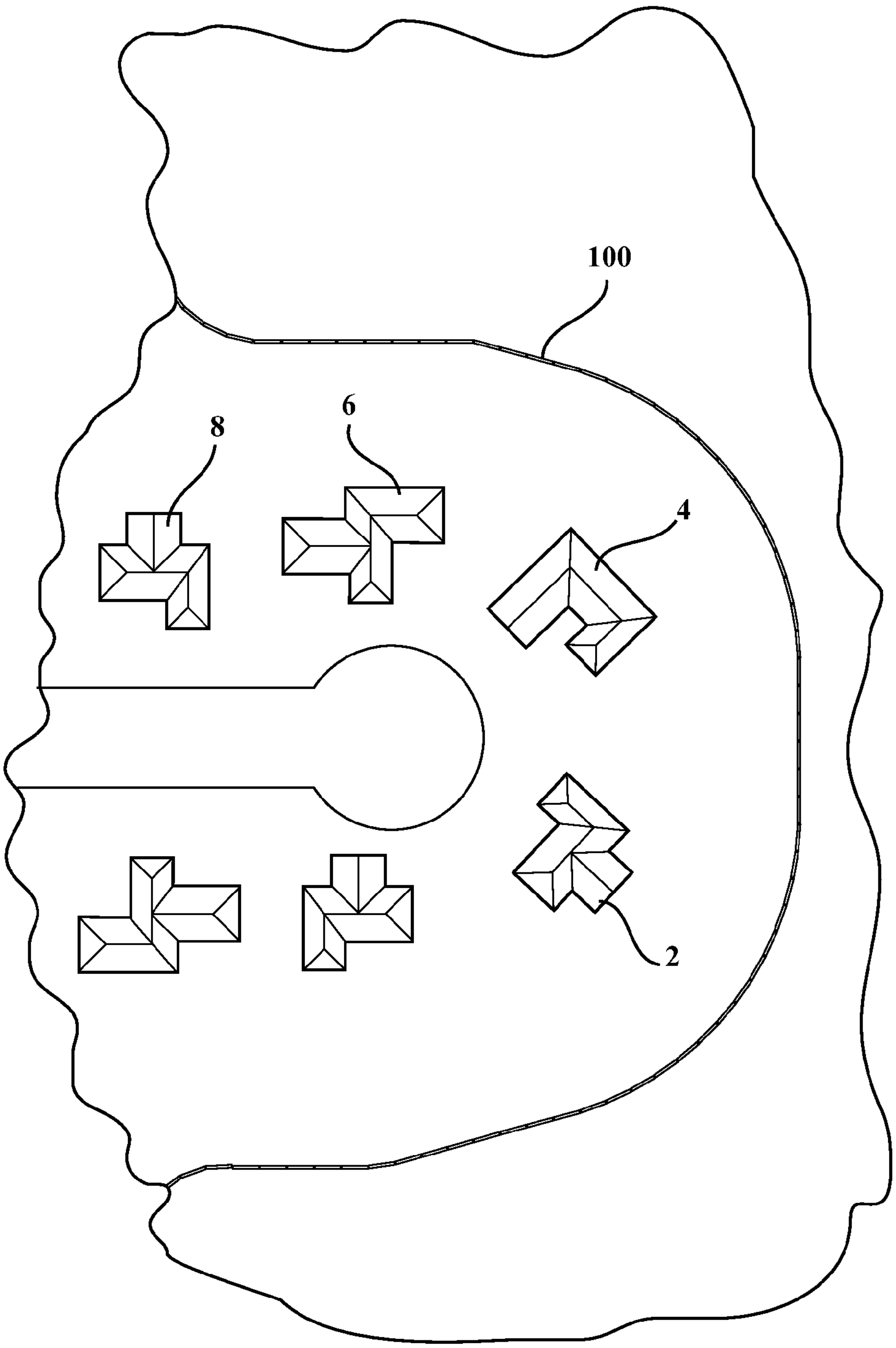
FIG. 10 is an enlarged illustration of a subset extending section of the fire curtain shown in FIG. 9.

As shown in the overhead environmental views of FIGS. 9 and 10, the present invention contemplates a plurality of individual housing assemblies engaged in end to end aligning fashion and which are generally represented by enclosed perimeter 100 and which can extend around a plurality of homes, see at 2, 4, 6, 8, et seq. which are associated with such as a residential development or other population/targeted geographic center which it is desirous to shield from a path of an oncoming fire. Beyond the illustrations shown, it is understood that the arrangement and configuration of the fire curtain assemblies can be established according to any desired configuration or arrangement and which will serve the purpose of retarding or redirecting a path of fire away from populated areas.

As further referenced in FIGS. 2 and 3, an extensible curtain 22 is provided and which is constructed of a flexible material having fire/heat retardant properties, such as further including a cloth, a polymer/plastic or composite. The flammability of fabric can be drastically reduced through the use of fire retardants. Many natural fibers, including cotton, can be topically treated with a chemical that reduces the fabric's flammability to the extent that it becomes nearly non-combustible. In one known application, and during a fire, the chemical reacts with the gases and tars generated naturally by the fabric, converting the gases and tars to a carbon char, thus drastically slowing the fabric's burning rate.

Other types of polyester fabrics are also considered to be permanently fire retardant. This is because fire retardant properties are built directly into the molecular structure of the fibers. Fabrics manufactured utilizing Trevira™ and Avora™ polyester fibers are considered inherently or permanently fire retardant. Other synthetic fabrics may be considered durably fire retardant, fire retardant, or non-fire retardant. Beyond those described, durably fire retardant materials refer to such as polyesters which are chemically treated during the manufacturing process with a non-water soluble chemical.

In other cases, synthetic fabrics may be topically treated with chemicals after the manufacturing process, in the same manner as natural fibers such as cotton. Among these, Aramid™ and Twaron™ are used in modern fabrics to withstand high temperatures in industry and fire-fighting.

The above said, the fire retardant curtain 22 is provided according to a desired width (such as several feet or more and which is equivalent to the overall length of the housing), an upwardly extending length (such as up to 12' in one non-limiting variant) and a thickness (such as in one non-limiting example of 0.020 mil or upwards). Both the semi-upwardly extended position of FIG. 2 and the fully extended position of FIG. 3 include an elevating mechanism of some type which, as illustrated, includes a pair of first and second elongated and side articulating supports which are utilized to upwardly displace the curtain.

Each articulating support includes a pair of end to end hingedly connected arms, see at 24 & 26 for first side extensible support and further at 28 & 30 for second side extensible support. As shown, the individual pairs of arms 24/26 and 28/30 pivotally interconnect at a central location, with opposite extending ends of each lower pivoting arm 24 and 28 connecting to a corner location of the housing, whereas the extending ends of each of upper pivotally connected arms 26 and 30 engaging top corner (typically reinforced) locations of a top lengthwise extending member in turn supporting the curtain 22, and such as further which may define opposite ends of a top and widthwise extending support bar 31. The arms 24-30 are each likewise constructed of a fire/heat retardant and rigid material consistent with all of the components and associated fasteners employed in the present design.

In this fashion, and as evidenced in FIG. 3, the upward pivoting extension of the articulating supports (see also arrows 32 and 34 in FIG. 2) causes the intermediate and articulating hinged connections 36 and 38 associated with each pair of side extensible supports to unfold/expand outwardly to a fully vertically extended position (FIG. 3), at which point the construction of the articulating hinged connections 36 and 38 being such that they can be locked or otherwise prevented from reverse folding, such utilizing known mechanical features, and until it is desired to unlock the articulating supporting hinged connections in order to downwardly retract the curtain 22.

FIG. 3 again is an illustration of the fire curtain of FIGS. 1 and 2 in a fully upwardly extended position in which the side articulating supports are generally vertically extending and the curtain is fully deployed. At this point, an intermediate and width extending bar support 40, this constructed in a similar nature as the articulating arms 24-30, is separately installed in width extending fashion across the curtain 22 and seats within seating locations established in opposing fashion within the hinged connections 36 and 38. The hinged connections can each exhibit a modified T shape connection and which, upon being fully upright extended, are maintained in the upright position by the presence of the center bar support 40, which can also be designed to prevent premature retraction of any variation of side articulating supports which do not otherwise employ a locking feature.

Additional upstanding reinforcing support is provided by a form of angular extending stanchion support terminating in such as a turf embedded stake, this including in one non-limiting variant rigid extending members such as shown by end to end connected pairs of rigid support poles 42 & 44 as well as at 46 & 48, these extending from top supporting locations, e.g. see selected upper corner reinforced location 50 of the curtain 22, and which are further supported at their angled ground location by turf engaging spikes 52 and 54. As shown in FIG. 3, the extending members can be provided by the multiple end-to-end assembleable pole sections 42 & 44 and 46 & 48 or in an alternative variant by a stanchion support provided as a tensioned cable configuration which is substituted for the rigid interconnected poles, with tension being applied to both first and second cables and translated to the turf engaging stakes and in order to maintain the assembly in an upright position.

Figure 4:
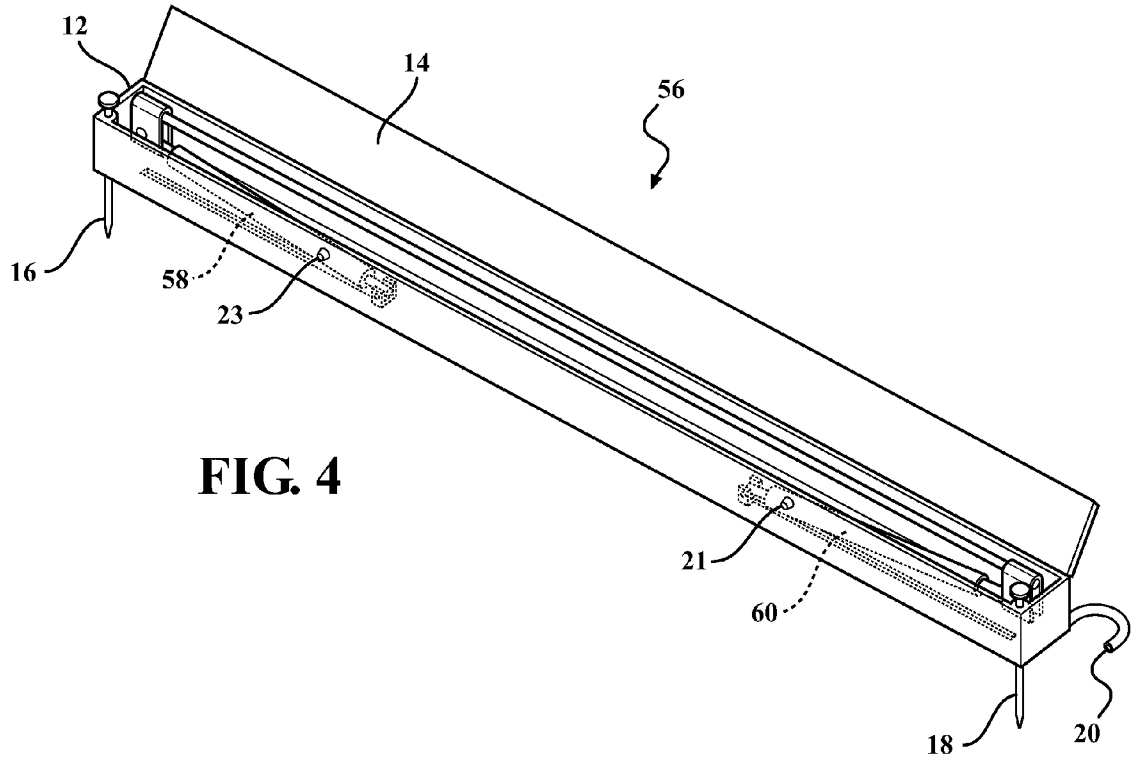
FIG. 4 is a perspective view of a fire curtain and elongate ground supported housing according to another embodiment in a first retracted position.

Referring now to FIG. 4, a perspective view is generally shown at 56 of a fire curtain and elongate ground supported housing according to another embodiment in a first retracted position. The features of the housing 12, lid, ground engaging spikes 16 and 18, hose bib 20, apertures 21 and 23, and curtain 22 all remain from the first described embodiment, such that a repetitive description is unnecessary. The variant of FIGS. 4-6 differs from that illustrated in FIGS. 1-3 in that the articulating pairs of arms are substituted by telescoping/pivoting elongate cylinders 58 and 60 which are utilized for upwardly displacing the curtain 22.

Figure 5:
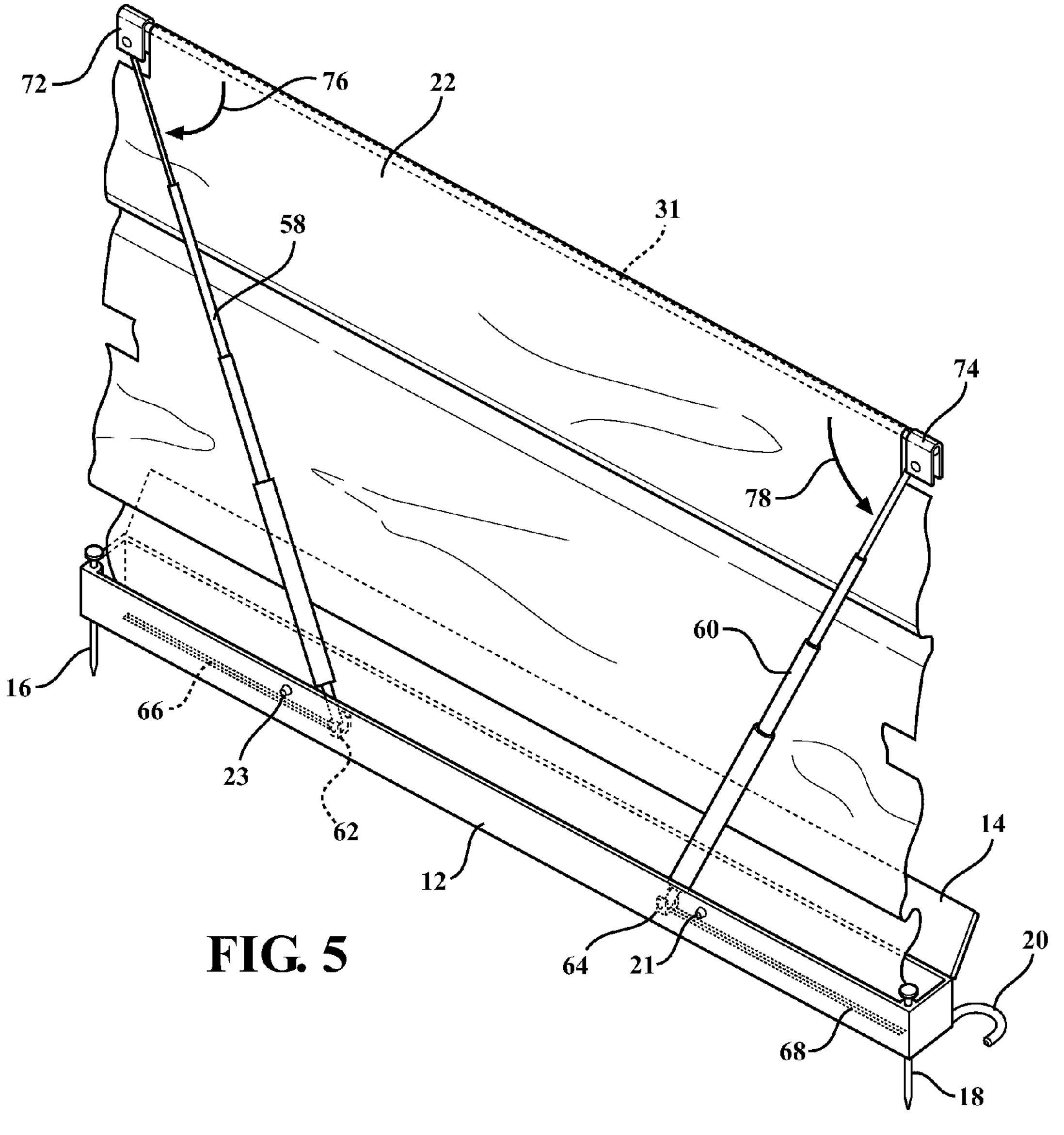
FIG. 5 is a succeeding illustration of the fire curtain of FIG. 4 in a semi upwardly extended position and by which generally side positioned and combination telescoping/pivoting elongate cylinders are utilized to upwardly displace the curtain.
Figure 6:
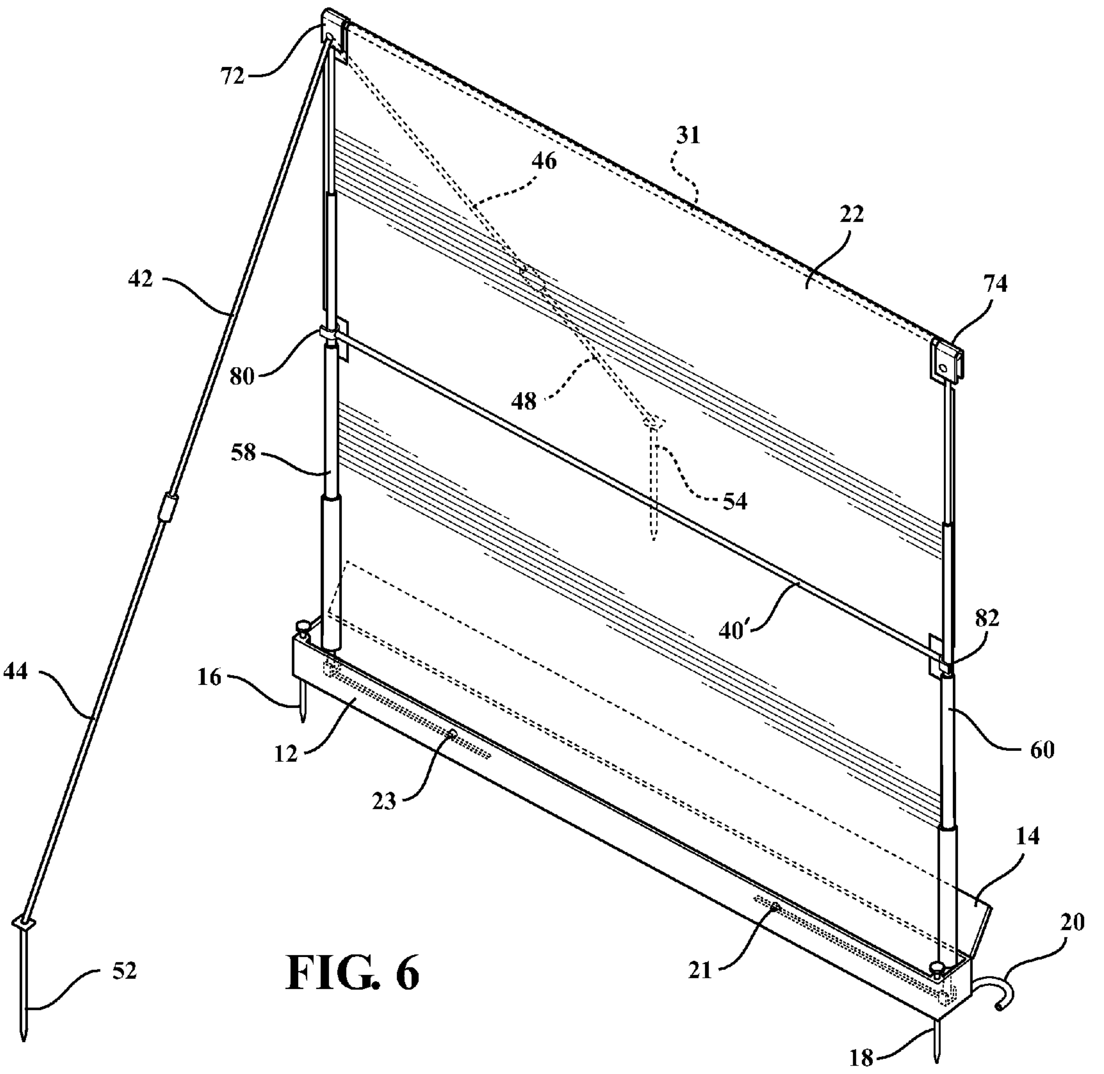
FIG. 6 is an illustration of the fire curtain of FIGS. 4 and 5 in a fully upwardly extended position and by which the side telescoping supports are generally vertically extending and again illustrating the feature of upstanding rigid supports or tension cables extending from top locations of the curtain and supported by ground engaged spikes.

FIG. 5 is a succeeding illustration of the fire curtain variant 56 of FIG. 4 and illustrates the cylinders (exhibited as extensible jacks with multiple coaxial components) 58 and 60 in a semi upwardly extended position, and by which the generally side positioned and combination telescoping/pivoting elongate cylinders are utilized to upwardly displace the curtain 22 in a similar fashion as in FIG. 2. The cylinders 58 and 60 are understood to include any type of fluid driven means, such as pneumatic or hydraulic and it is further understood that a CO2 (carbon dioxide) charge or the like can be employed for quickly activating both cylinders in timed and simultaneous fashion in order to quickly elevate the curtain 22.

As further shown in FIG. 5, the elongate configured and extensible cylinders 58 and 60 each include lower pin ends 62 and 64 which are both traversable along and pivotally connected to outermost width extending tracks, see further associated sections 66 and 68 depicted in phantom and which are defined in the recessed base of the housing 12. In combination with upper and reinforce corner connections 72 and 74 established between the curtain 22 (see again top bar 31) to which are pivotally engaged upper extending ends of the cylinders 58 and 60, the extensible/pivotal action of the expanding cylinders 58 and 60 occurs simultaneous with laterally outward traversing displacement of the pins 62 and 64 along their bottom supported tracks 66 and 68 (see also directional arrows 76 and 78 in FIG. 5) and until achieving a vertical position shown in FIG. 6 which is commensurate with that shown in the embodiment of FIG. 3. Without limitation, such bottom traversing displacement can be manually assisted by the installer applying an outward pivoting force to lower ends of each expanding cylinder.

A variation of center bar 40' depicted in FIG. 6 can again be installed in width extending fashion across a generally midpoint of the curtain, the bar 40 further illustrating opposite end extending "U" shaped clips 80 and 82 such as which secures to intermediate locations associated with the elongate and side extensible cylinders 58 and 60. It is also envisioned that the top 31 and intermediate 40' support bars can be pre-engaged to locations associated with each of the cylinders 58 and 60, following which the top bar 31 is extended to its fully upwardly displaced height and the cylinders are engaged or otherwise locked to prevent the inner telescoping members from retracting.

In addition to each of the telescoping cylinders exhibiting multiple coaxial and inter-expanding sections (as shown), it is additionally envisioned that each can also be reconstructed to include a single lower elongated housing from which a generally similar length elongated inner telescoping member extends, and in order to establish a desired overall height associated with the curtain assembly. As with the first disclosed variant, any type of rigid or tautened ground engaging stanchion supports can be provided, such as including rigid support members (or alternatively tensioning cables) and such as is shown by rigid and interconnected pairs of rods 42 & 44 and 46 & 48 which connect to upper end location 72 of the curtain 22 as well as engaged by turf stakes 52 and 54 at lower ends (it also being understood that a further pair of rigid poles or tautened/stretched cables can be engaged to opposite upper end location 74 (although and in the instance of multiple end to end interconnected housings it would be practicable and necessary to only provide one angled support arrangement per each housing).

Figure 7:
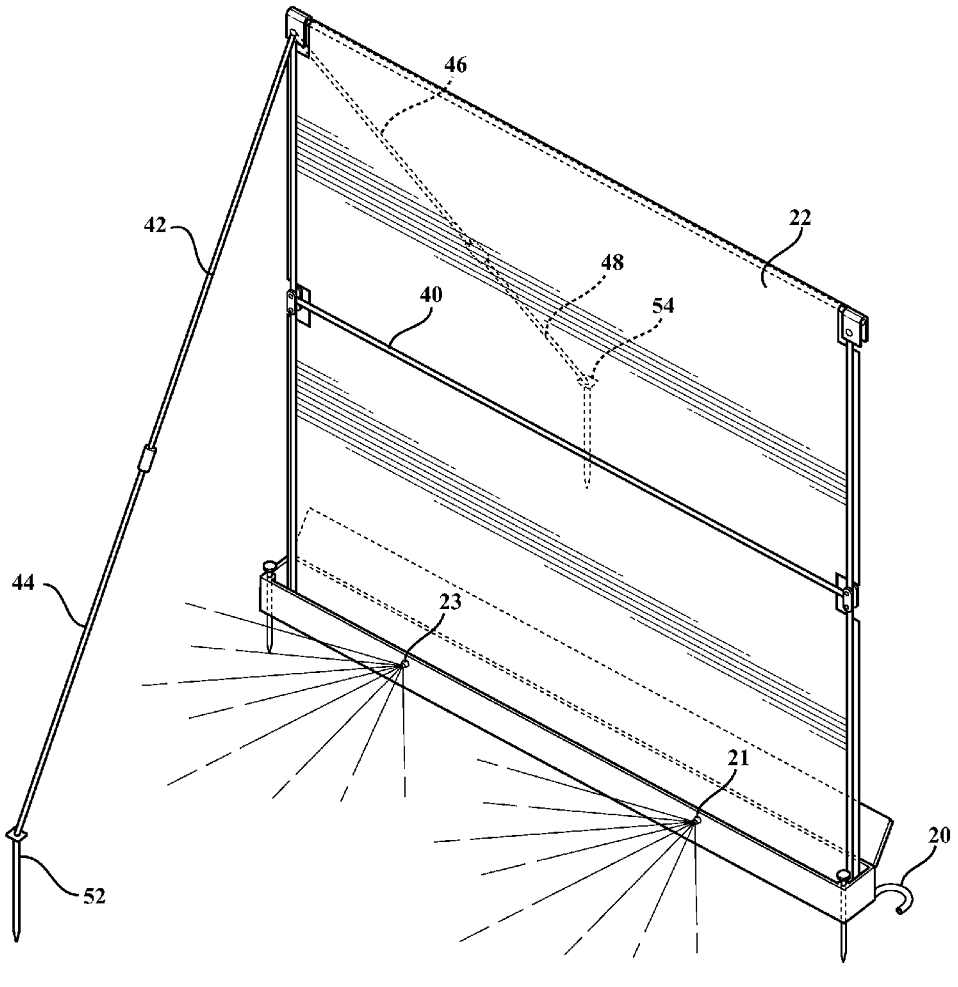
FIG. 7 is an illustration of any variant in which a fire retardant fluid can be emitted as a spray or misting pattern both forwardly/upwardly from locations associated with the elongated and ground supported housing.

Referring now to FIG. 7, an illustration is shown of any variant in which a fire retardant fluid (such as water but also envisioned to include any type of flame retardant spray or misting pattern) is applied in both forwardly/upwardly directed fashion from the aperture locations 21 and 23 associated with the elongated and ground supported housing 12, reference again being made to the construction of the inter-housing and fluid conveying conduit as depicted in FIG. 1. As further shown in FIG. 8, and as previously explained in FIG. 1, the construction of the individual assemblies 10 is such that an extending hose bib 20 of a given housing is caused to seat within a fluid conduit receiving aperture associated with a receiving location defined in a succeeding and end aligned housing.

In this fashion, the internal conduit 19 associated with each housing communicates with any selected number of spray issuing apertures, such as again depicted at 21 and 23. By interconnecting a plurality of housings in the fashion shown in FIG. 8, a pressurized fluid inlet (such as provided communicated to an initial one of the curtain assemblies via a hose) provides a consistent spray pattern as shown and in order to further increase the effectiveness of the overall curtain assembly.

Figure 8:
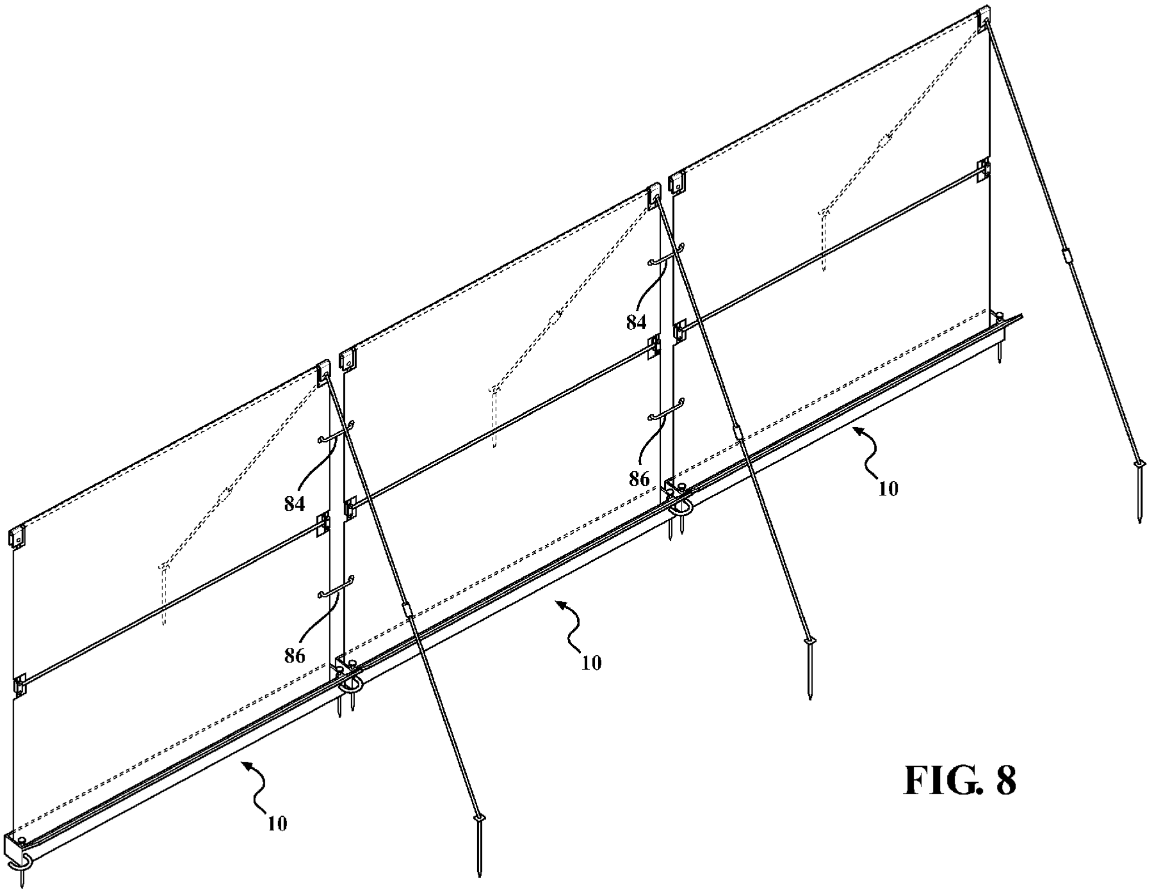
FIG. 8 is a successive illustration to that shown in FIG. 7 and by which a hose bib associated with each edge location of a given housing connects to a succeeding housing in order to communicate fluid between each assembly.

Although not shown, it is envisioned that the vertical side extending edges of each curtain 22 can include any of hook and loop fasteners, sliding or other engagement tracks or the like (see as representatively shown at 84 and 86 in FIG. 8) and so that a unitary interconnected construction is created by any plurality of end-to-end connected housing assemblies shown in FIG. 8. In this fashion, a plurality of interengaged and perimeter/front extended fire curtain assembles can provide a reasonable degree of fire/flame retardant interference for protecting, or at least delaying in more extreme instances, the path of travel of grass/brush/shrub fires and the like.

Having described my invention, other and additional preferred embodiments will become apparent to those skilled in the art to which it pertains, and without deviating from the scope of the appended claims.

I claim:

1. A ground supported and upwardly deployable fire curtain assembly, comprising:

an elongate and three dimensional rectangular shaped housing having a pivotally associated lid, said housing adapted to being set upon a ground location;

a fire retardant curtain contained within said housing in a stored position;

an elevating mechanism supported within said housing in said stored position and engaging said curtain, said elevating mechanism including a pair of elongate cylinders supported in combined pivotal and extensible fashion with said housing, a lower end of each of said cylinders pivotally securing to inside locations of said housing, said cylinders each having a plurality of telescopically extensible portions, an extensible uppermost end portion of each of said cylinders pivotally engaging spaced apart locations of a rod supporting an upper edge of said curtain;

upon actuating said elevating mechanism, said cylinders causing said curtain to be elevated above said housing to a use position, concurrent with said lower ends of said cylinders displacing in opposite outward directions so as to align with vertical edges of said curtain in said upwardly deployed position, and a hose bib extending from a side location associated with said housing and communicating with at least one spray aperture extending through the housing and communicating to said bib via an internal conduit.

2. The fire curtain as described in claim 1, further comprising at least one ground engaging spike extending from said housing.

3. The fire curtain as described in claim 1, further comprising a plurality of housings positioned in end-to-end aligned fashion to create an uninterrupted wall of curtains.

4. The fire curtain as described in claim 3, further comprising a hose bib of a first housing engaging an internal conduit associated with a successively positioned housing.

5. The fire curtain as described in claim 3, further comprising fasteners engaging aligning and vertical extending edges of each of said plurality of housings.

6. The fire curtain as described in claim 1, further comprising a widthwise extending and center support bar incorporated into an intermediate location of said curtain, said center support bar including clip ends which engage intermediate locations associated with said plurality of telescopically extensible portions of said cylinders.

7. The fire curtain as described in claim 1, further comprising at least one stanchion support for maintaining said elevating mechanism and curtain in the use position.

8. The fire curtain as described in claim 7, said at least one stanchion support further comprising rigid support poles extending from each of opposite ends of a top and widthwise extending support rod associated with said curtain, a bottom of said housing further supported upon the ground location by a ground engaged spike.

9. The fire curtain as described in claim 1, said curtain further comprising a polyester or cotton fiber treated with a flame/heat inhibiting chemical.

10. A ground supported and upwardly deployable fire curtain, comprising:

a housing exhibiting an elongated and three dimensional rectangular construction having a pivotally associated lid;

a fire retardant curtain contained within said housing in a stored position;

an elevating mechanism supported within said housing in said stored position and engaging a support associated with an upper extending edge of said curtain, said elevating mechanism including a pair of elongate cylinders supported in combined pivotal and extensible fashion with said housing, a lower end of each of said cylinders pivotally securing to inside locations of said housing via pins, said cylinders each having a plurality of telescopically extensible portions displaceable along a pair of tracks defined along said inside locations of said housing during each of elevating or lowering of said curtain, an extensible uppermost end of each of said cylinders pivotally engaging spaced apart locations of said support;

upon actuating said mechanism, said cylinders simultaneously extending and displacing in opposite and outward directions along said tracks, causing said curtain to be elevated to a use position above said housing and so that said telescopically extensible portions align with vertical edges of said curtain in said upwardly deployed position; and a hose bib extending from a side location associated with said housing and communicating with at least one spray aperture extending through the housing and communicating to said bib via an internal conduit.

11. The fire curtain as described in claim 10, further comprising a plurality of housings positioned in end-to-end aligned fashion to create an uninterrupted wall of curtains, a hose bib of a first housing engaging an internal conduit associated with a successively positioned housing.

12. The fire curtain as described in claim 11, further comprising fasteners engaging aligning and vertical extending edges of each of said plurality of housings.

13. A ground supported and upwardly deployable fire curtain assembly, comprising:

a plurality of elongate and three dimensional rectangular shaped housings, each having a pivotally associated lid, said housings adapted to being set upon a ground location in an end-to-end aligning fashion;

a fire retardant curtain contained within each of said housings in a stored position;

an elevating mechanism supported within each of said housings in said stored position and engaging said curtain, said elevating mechanism including a pair of elongate cylinders supported in combined pivotal and extensible fashion with said housing, a lower end of each of said cylinders pivotally securing to inside locations of said housing, said cylinders each having a plurality of telescopically extensible portions, an extensible uppermost end portion of each of said cylinders pivotally engaging spaced apart locations of a rod supporting an upper edge of said curtain;

upon actuating said elevating mechanism, said cylinders causing each of said curtains to be elevated above said housing to a use position, concurrent with said lower ends of said cylinders displacing in opposite outward directions so as to align with vertical edges of said curtain in said upwardly deployed position;

fasteners engaging aligning and vertical extending edges of each successively positioned housing; and a hose bib extending from a side location associated with each of said housings and communicating with at least one spray aperture extending through said housings and communicating to said bib via an internal conduit.

14. The fire curtain as described in claim 13, further comprising a hose bib extending a first selected one of said housings and engaging an internal conduit associated with a further selected and successively positioned housing.

15. The fire curtain as described in claim 13, further comprising said lower end of each of said cylinders pivotally securing to inside locations of said housing via pins which are displaceable along a pair of tracks defined along said inside locations of said housing so that said cylinders simultaneously extend and displace in said opposite and outward directions along said tracks, during elevation of said curtain to a use position.

* * * * *